United States Patent Office 3,391,129
Patented July 2, 1968

3,391,129
METHOD OF IMPARTING ANTI-CLING PROPERTIES TO ETHYLENE-VINYL ACETATE FILMS
Arnold F. Sparks, Holcomb, Ontario, Canada., assignor, by mesne assignments, to Mobil Oil Corporation, a corporation of New York
No Drawing. Filed Aug. 30, 1965, Ser. No. 483,857
4 Claims. (Cl. 260—86.7)

ABSTRACT OF THE DISCLOSURE

Compositions useful in the formation of thermoplastic packaging films such as an ethylene-vinyl acetate copolymer, for example, which are characterized by containing small amounts of an alkyl phenoxy polyethoxy ethanol additive which in addition to imparting anti-fogging properties to such films, simultaneously substantially reduces or inhibits the cling characteristics of such film products.

---

The present invention relates generally to improved thermoplastic sheeting and films, and more particularly to new fogging resistant wrapping materials which are specially adapted to wrapping moisture-containing and moisture-emitting products such as fresh meats, poultry, fresh vegetables, and the like and more specifically to wrapping products which are subjected to refrigeration while so packaged. It is especially adapted for making such packaging materials from thermoplastic polymers and copolymers such as ethylene-vinyl acetate copolymers, for example, and lamitations of such materials.

It has become wide-spread commercial practice in the merchandising of freshly cut meats, and other produce, to wrap individual items such as cuts of meat in films of transparent plastic material. The thus- wrapped products are visible through the packaging material and can be displayed, for example, in a refrigerated counter.

The physical characteristics of the wrapping material are quite important for this type of application. The package should be attractive and the inner surface of the plastic wrapping material must be resistant to fogging under conditions of refrigeration and during changes of temperature. Additionally, the film surface characteristics must be suitable for ease of manual, semi-automatic or automatic manipulation thereof during packaging operations. Also important is the fact that the package should transmit oxygen at a sufficient rate when used to encase freshly cut red meat such that the red color or so-called bloom of the meat is preserved. The film must also be capable of being readily and tightly sealed, preferably by heat, to substantially prevent leakage of moisture and juices contained in the completed package.

Since many thermoplastic films inherently possess properties of high permeability to oxygen, low water permeability, and excellent low temperature sealability, transparent thermoplastic film or sheeting offers a good material for use as a base in such packaging.

Ethylene-vinyl acetate copolymers which contain minor amounts of vinyl acetate monomer, i.e., at least less than 50%, have been found to be especially suited for the wrapping of meat products and further, by controlling the amount of vinyl-acetate content of the copolymer structure to within certain specified limits, overwrap films are obtained which possess good oxygen permeability, wide heat seal ranges, and a degree of stretch or elasticity which allows the film to be drawn tightly over particularly odd shaped cuts of meat such as roasts or hams and the like and closely conform to the contour of the meat products being wrapped, thereby producing an especially pleasing and attractive package. It has been found that ethylene-vinyl acetate films which contain from about 2 to about 20% and preferably from about 12 to about 18%, by weight vinyl acetate in the copolymer resin will form films which give the above noted preferred properties for meat wrap applications.

However, thermoplastic wrapping materials, such as copolymer of ethylene and vinyl acetate, possess the undesirable property of fogging when exposed to moisture emitting products. This is due to the condensation of moisture, in the form of tiny droplets, particularly on the side of the film exposed to the moisture containing product. In particular, it has been noticed that such condition occurs more noticeably when the wrapped, moisture containing products are subjected to temperature changes such as refrigeration after having been packaged. In addition to the fogging tendencies of thermoplastic films, certain thermoplastic films and in particular films fabricated from copolymer resins containing certain ratios of ethylene-vinyl acetate, i.e., from about 2 to about 20% by weight of vinyl acetate, possess the added disadvantage of having excessive tack or clinginess with respect to itself and other surfaces, making it impractical for manual or automatic wrapping applications.

Attempts have ben made in the past to reduce the above described fogging tendencies of such films by applying hydrophillic coatings to the surface thereof which tends to overcome the natural hydrophobic characteristics of the film surface and causing the condensed moisture to wet-out on the film surface, thereby eliminating individual droplet formation and attendant fogging. However, such coatings usually detract from the optical properties of the film such as gloss and haze and necessitate costly coating process steps. A further disadvantage of these coatings is the attendant loss of oxygen permeability of the coated film. This decreased oxygen permeability tends to cause packaged products such as meat to discolor and lose its natural bloom. Other disadvantages of such coated films include impairment of the heat sealability of the thermoplastic base film as well as the coatings on such films having a tendency to crack and craze when the films are stretched and pulled around products being overwrapped. Moreover, disadvantages such as excessive tack or clinginess, hereinbefore discussed as inherent in certain preferred thermoplastic meat wrap films such as films of ethylene-vinyl acetate copolymer resin, cannot be overcome by coating a single side of the film with such hydrophillic coatings. Attempts to remedy this problem have centered mainly around lowering the ratio of vinyl acetate to ethylene present in the copolymer. However, it has been found that by using such methods in order to reduce the film tackiness to an acceptable level, the physical properties desired in the copolymer film, vis. elasticity, film tensile strength and oxygen permeability, are sacrificed to the extent that it is no longer an acceptable candidate film for meat wrapping applications.

The film products of the present invention are thermoplastic films which are resistant to fogging caused by moisture, possess excellent optical characteristics and increased oxygen permeability as well as the preferred physical surface characteristics, more notably the absence of undesired tack or clinginess.

It has been discovered that a homogeneous blend of an alkyl phenoxy polyethoxy ethanol and particularly octyl phenoxy polyethoxy ethanol additive at low concentration with a thermoplastic resin such as an ethylene-vinyl acetate copolymer may be used to produce products with improved an unexpected properties compared to products produced from the same unmodified resin. Thus, packaging films from such compositions exhibit improved physical surface characteristics, particularly freedom from excessive tackiness or cling. Additionally, these films possess anti-fogging properties, without a coating of an additional material, for the packaging of moisture containing foods. They also exhibit improved permeability to oxygen, which is important in preserving the bloom of fresh meat.

It has been found that additives useful in the practice of the present invention are alkyl phenoxy polyethoxy ethanols, and particularly those containing an average number of ethylene oxide groups of 12 to 13, and further identified by the following structural formula:

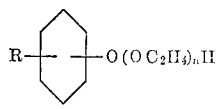

wherein R is an alkyl hydrocarbon radical, preferably containing 8 carbon atoms and $n$ is an integer of at least 8 and preferably from about 12 to about 13.

The ratio of alkyl phenoxy polyethoxy ethanol additive to ethylene-vinyl acetate copolymer resin may vary from about 0.1% to about 3% by weight of the ethylene-vinyl acetate copolymer resin. The preferred ratio will depend on the specific improvements desired as well as the % by weight vinyl acetate present in the copolymer material. When employing ethylene-vinyl acetate copolymer resins containing from about 12% to about 18% by weight of vinyl acetate in the copolymer a ratio of about 0.5 to about 2.0% by weight of the alkyl phenoxy polyethoxy ethanol additive has been found to be particularly suitable in effecting the desired reduction in surface cling of the film and at the same time imparting anti-fogging properties and improved oxygen transmission.

In carrying out the process of this invention the alkyl phenoxy polyethoxy ethanol additive is mixed with the thermoplastic resin to obtain a thorough distribution of the additive throughout the thermoplastic resin.

The addition of the alkyl phenoxy polyethoxy ethanol can be accomplished in any convenient manner so long as there is attained a thorough distribution of the additive throughout the thermoplastic. For example, the components can be mixed together in a ribbon blender, a Hobart mixer, paddle blender, and the like.

It is preferred to conduct total mixing, or at least a portion of it, at a temperature sufficiently high to flux the components in order to produce a blend of better uniformity and greater homogeneity. The hot mixing can be satisfactorily carried out in a Banbury mixer, or a two-roll mill, in a compounding extruder or other such apparatus. Also, a portion of the mixing can be combined with the shaping or forming operation as, for example, by accomplishing the final mixing in the barrel of the forming extruder. Also, the hot mixing and thorough blending of components can be accomplished by a masterbatch technique whereby the alkyl phenoxy polyethoxy ethanol is blended with the thermoplastic resin at a higher concentration than is desired in the final fabricated product by using a Banbury mixer, two roll mill, compounding extruder or other such apparatus, and then blending this composition thoroughly with additional thermoplastic resin to the desired concentration of additive using a Banbury mixer, two roll mill, compounding extruder, or other such apparatus. Alternatively, a dry blending apparatus may be used along with the shaping and forming equipment to accomplish the reduction to desired concentration. Such dry blending apparatus may be a ribbon mixer, cone blender, Hobart mixer, paddle blender, and the like.

Thus, in carrying out the process of this invention, the alkyl phenoxy polyethoxy ethanol is thoroughly blended with a thermoplastic resin such as a copolymer of ethylene and vinyl acetate and if a portion of this blending does not consist of the shaipng and forming process, an additional subdivisional process is carried out to obtain the blended resin in a form suitable for the shaping, forming or fabrication process. Such a subdivision process may be granulation, extrusion and pelletization, milling to sheets followed by dicing, or other such process.

In carrying out this invention, other additives may be added to the resin as required. Thus, antioxidants, pigments, fillers, dyes, ultraviolet absorbers, slip agents, anti-blocking agents and the like may also be added.

In addition to the desirable anti-fog and anti-cling properties which the additive of the present invention imparts to single layer ethylene-vinyl acetate copolymer films, laminar film structures which employ ethylene-vinyl acetate copolymer material as an exterior layer are also within the scope of the present invention. For example, certain combinations of films in a laminar structure result in a combination of the preferred physical properties of each of the respective films comprising the laminate. In the case of meat wrap films, it is sometimes desirable to employ such laminate constructions. When employing ethylene-vinyl acetate copolymer films in meat-wrap applications, for example, it may be desirable to incorporate, as an inner laminar layer, a very thin film of a high melting point polymer to improve the heat-seal range of the product. Polypropylene, for example, has been found to be suitable for this purpose. Generally, such a combination would consist of two exterior layers of the ethylene-vinyl acetate copolymer material and a thin inner layer of polypropylene. It has been found that, if the ethylene-vinyl acetate copolymer layers of such a structure contain the alkyl-phenoxy polyethoxy ethanol additive of the present invention, the same excellent anti-fog properties and the same reduction of surface cling are achieved as in the case of single layer ethylene-vinyl acetate copolymer structures as hereinbefore described.

The anti-fogging test referred to in the following tables is conducted as follows: A deep glass dish is partially filled with water. The film under test is stretched over the opening of the dish and wedged into place by partially inserting into the dish the bottom of a second dish. The film is cooled by placing ice into the upper dish. The material is permitted to stand in an air-conditioned laboratory. The film is satisfactory if the underside is fogged over an area of less than one half square inch after standing for forty-five minutes.

Oxygen permeability, as referred to in the following tables, is measured by the following method. Multiple samples of film are mounted in a suitable apparatus so that oxygen gas, saturated with water vapor and essentially at atmospheric pressure, is circulated over one surface of each film while pure carbon dioxide, also saturated with water vapor at the same pressure, is circulated over the opposite sides as a sweep gas. The effluent carbon dioxide is passed into a nitrometer containing a 50% aqueous solution of potassium hydroxide which absorbs the carbon dioxide and permits the transmitted oxygen to be collected and measured volumetrically. Knowing the total area of film exposed, the time period during which the sweep gases are collected in the nitrometer, and the thickness of the film samples used, one can calculate permeability in terms of standard units:

$$\frac{\text{cc.}-\text{mil.}}{100 \text{ in.}^2 - 24 \text{ hrs.} - \text{atmos.}}$$

The property of surface cling cling or tack; as referred to in the following tables is measured as follows: A sample of the film to be tested is manually drawn across the surface of a smooth metallic member, similar to the metallic surfaces most frequently encountered in over-wrap packaging equipment. If the film slides smoothly across the surface of the metallic member, without sticking or adhering thereto, it is designated as acceptable. If movement of the film across the metallic surface is erratic, due to the film sticking to the surface thereof, it is considered unsatisfactory.

The following table, Table I, compares the properties of unmodified ethylene-vinyl acetate copolymer films with films containing varying amounts of Triton X–102, an additive marketed by the Rohm and Hass Company and identified as octyl phenoxy polyethoxy ethanol containing an average number of ethylene oxide groups of from about 12 to about 13. The ethylene-vinyl acetate resins employed contained approximately 16% vinyl acetate by weight in the copolymer. The films tested were extruded under identical extrusion conditions and temperature.

tion, possess excellent anti-fogging properties as well as reduced cling. Additionally, the presence of the Triton X–102 additive in the ethylene-vinyl acetate copolymer layers results in a laminar film having greatly improved oxygen permeability properties when compared to films not containing this additive.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

TABLE I

| Material | Gauge (Mils) | Anti-Fogging Test | Cling Test | Oxygen Permeability, cc. (Mil) (Day) 100 Sq. In. (Atm.) | Tensile | |
|---|---|---|---|---|---|---|
| | | | | | Yield (p.s.i.) | Ultimate (p.s.i.) |
| E-VA[1] Film | 0.768 | Failed | Failed | 257 | MD[2], 1,170 / TD, 710 | MD, 4,540 / TD, 3,360 |
| E-VA Film plus 0.5% Triton X-102 | 0.724 | No Fog | Acceptable | 568 | MD, 1,700 / TD, 852 | MD, 5,260 / TD, 2,920 |
| E-VA Film plus 1.0% Triton X-102 | 0.773 | do | do | 584 | MD, 1,520 / TD, 872 | MD, 5,320 / TD, 3,180 |
| E-VA Film plus 2.0% Triton X-102 | 0.739 | do | do | 515 | MD, 1,080 / TD, 675 | MD, 4,130 / TD, 277 |

[1] Ethylene-Vinyl Acetate.
[2] MD = Machine Direction; TD = Transverse Direction.

From the foregoing table, it will be seen that ethylene-vinyl acetate copolymer films which contain varying amounts of Triton X–102, i.e., from about 0.5% to about 2.0%, possess excellent anti-fogging properties as well as having acceptable levels of cling making them well adapted to the packaging of moisture emitting products such as fresh meat and other produce. Additionally, it has been found, as reflected in the foregoing table, that such additive containing films exhibit higher oxygen permeability as compared to comparable films containing no additive.

As previously disclosed, the ethylene-vinyl acetate copolymer films of the present invention may be employed in laminar constructions. The following table, Table II, compares the properties of unmodified ethylene-vinyl acetate copolymer films with laminar film constructions comprising three layers, a center layer of polypropylene film integrally bounded to exterior layers of ethylene-vinyl acetate films, with and without the Triton X–102 additive. The ethylene-vinyl acetate resins employed contained approximately 16% vinyl acetate by weight in the copolymer material. The films tested were extruded under identical extrusion conditions and temperature.

What is claimed is:

1. A method for the preparation of a anti-cling thermoplastic film composition which comprises forming a homogeneous blend of an ethylene-vinyl acetate copolymer, said copolymer containing less than 50% by weight of vinyl acetate monomer in said copolymer and from about 0.5 percent to about 2.0 percent by weight of the compound

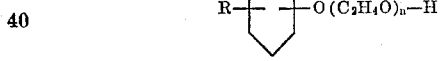

wherein R is an alkyl radical and $n$ has a value of at least 8, and extruding said homogeneous blend into a film.

2. The method of claim 1 wherein said film is extruded as a multi-layer laminate with the exterior layer constituting said homogeneous blend.

3. The method of claim 1 wherein said laminate comprises an interior layer of polypropylene and two exterior layers of an ethylene-vinyl acetate copolymer con-

TABLE II

| Material | Gauge (Mils) | Anti-Fogging Test | Cling Test | Oxygen Permeability, cc. (mil) (Day) 100 Sq. In. (Atm.) | Tensile | | Percent Polypropylene |
|---|---|---|---|---|---|---|---|
| | | | | | Yield (p.s.i.) | Ultimate (p.s.i.) | |
| E-VA[1] Film | 0.768 | Failed | Failed | 257 | MD,[2] 1,170 / TD, 710 | MD, 4,540 / TD, 3,360 | 0.0 |
| E-VA Film plus 0.5% Triton X-102 | 0.724 | No Fog | Acceptable | 568 | MD, 1,700 / TD, 852 | MD, 5,260 / TD, 2,920 | 0.0 |
| E-VA Film plus 1.0% Triton X-102 plus propylene core | 0.787 | do | do | 520 | MD, 1,000 / TD, 864 | MD, 2,800 / TD, 1,980 | 5.1 |
| E-VA Film plus 1.5% Triton X-102 plus polypropylene | 0.768 | do | do | 478 | MD, 1,100 / TD, 958 | MD, 3,640 / TD, 2,740 | 5.0 |
| E-VA Film plus 2.0% Triton X-102 plus polypropylene core | 0.724 | do | do | 515 | MD, 1,032 / TD, 908 | MD, 2,560 / TD, 1,980 | 4.2 |
| E-VA Film plus polypropylene core | 0.739 | Failed | Failed | 474 | MD, 1,300 / TD, 1,100 | MD, 5,000 / TD, 3,200 | 7.3 |

See footnotes at end of Table I.

As apparent from the data contained in the foregoing table, laminar films containing ethylene-vinyl acetate copolymer exterior layers which have been modified with the Triton X–102 additive material of the present invention, possess excellent anti-fogging properties as well as reduced cling. Additionally, the presence of the Triton X–102 additive in the ethylene-vinyl acetate copolymer layers results in a laminar film having greatly improved oxygen permeability properties when compared to films not containing this additive.

taining from about 0.5 percent to about 2.0% by weight of the compound as set forth in claim 1.

4. The method of claim 1 wherein said ethylene-vinyl acetate copolymer contains about 12% to about 18% by weight of said vinyl acetate monomer in said copolymer.

References Cited

UNITED STATES PATENTS

| | | | | |
|---|---|---|---|---|
| 2,143,482 | 1/1939 | Herrmann | | 106—13 |
| 2,561,010 | 7/1951 | Carson | | 106—13 |
| 2,932,323 | 4/1960 | Aries | | 138—55 |
| 2,956,723 | 10/1960 | Tritsch | | 229—48 |
| 3,022,178 | 2/1962 | Park | | 106—13 |
| 3,048,263 | 7/1962 | Sacks | | 106—13 |
| 3,048,265 | 8/1962 | Hackhel | | 106—13 |
| 3,048,266 | 8/1962 | Hackhel | | 106—13 |
| 3,226,352 | 12/1965 | Helfin | | 106—13 |
| 3,275,616 | 9/1966 | Hammond | | 106—13 |

OTHER REFERENCES

Materials and Compounding for Rubber and Plastics, Rubber World, 1965, page 631. (Copy in Scientific Library.)

Schwartz Surface Active Agents, 1949, vol. 1, page 511.

JULIUS FROME, *Primary Examiner.*

UNITED STATES PATENT OFFICE
CERTIFICATE OF CORRECTION

Patent No. 3,391,129                      July 2, 1968

Arnold F. Sparks

It is certified that error appears in the above identified patent and that said Letters Patent are hereby corrected as shown below:

In the heading to the printed specification, line 5, "Ontario, Canada" should read -- New York --.

Signed and sealed this 30th day of December 1969.

(SEAL)

Attest:

Edward M. Fletcher, Jr.                      WILLIAM E. SCHUYLER, JR.

Attesting Officer                             Commissioner of Patents